Patented Feb. 28, 1933

1,899,507

UNITED STATES PATENT OFFICE

ALPHONS O. JAEGER, OF MOUNT LEBANON, AND HERBERT J. WEST, OF CRAFTON, PENNSYLVANIA, ASSIGNORS, BY MESNE ASSIGNMENTS, TO THE SELDEN RESEARCH & ENGINEERING CORPORATION, OF PITTSBURGH, PENNSYLVANIA, A CORPORATION OF DELAWARE

MANUFACTURE OF SILVER SALT

No Drawing. Application filed March 28, 1931. Serial No. 526,135.

This invention relates to the production of silver salt by the sulfonation of anthraquinone.

In the past silver salt, which is beta-sulfoanthraquinone and is used as a main intermediate for the production of alizarin, has been prepared by the sulfonation of purified anthraquinone, and it has been believed in the past that anthraquinone of customary purity was necessary. This has notably been the case with anthraquinone obtained by the chemical oxidation of anthracene or synthetically from phthalic anhydride and benzol. Even small traces of some of the impurities, notably methyl anthraquinone, resulted in the production of a silver salt which, when transformed into alizarin, gives a dye of very poor shade. We have found that the deleterious effect of impurities on the silver salt is a highly specific one, that is to say only certain impurities are troublesome, whereas even considerable quantities of other impurities do no harm.

The present invention is based upon the fact that we found that anthraquinone produced by the catalytic vapor phase air oxidation of anthracene without further purification can be used directly to produce silver salt, for while the product is by no means chemically pure anthraquinone, all of the impurities, even any small traces which affect the shade of the dye made from the silver salt are destroyed in the catalytic oxidation. Therefore, it is possible by the present invention to use a catalytic unpurified anthraquinone containing a far larger amount of impurities than synthetic, and chemically oxidized anthraquinones which are not sufficiently pure for silver salt production can be used.

Not only is a silver salt produced from unpurified catalytic anthraquinone which is free from constituents which adversely affect the shade of dyes made from it but, strange as it may seem, the yield is not injuriously affected by the presence of the impurities in the unpurified anthraquinone used. In the catalytic oxidation of anthracene the anthraquinone containing vapors leaving the converters are usually fractionally condensed, since in chemical processes the raw material used is an impure anthracene which normally contains from 25–40% of impurities and may in some cases contain up to 60% of impurities. All of the impurities which could injuriously affect the shade of dyes made from silver salt are burned up or transformed into harmless products, but because of the very large amount of impurities present in the raw material the vapors issuing from the converter contain in addition to anthraquinone considerable quantities of oxidation products of the impurities and therefore a rough separation is normally made by condensing the vapors fractionally, that is to say in a plurality of condensers maintained at different temperatures. In the condensers maintained at a fairly high temperature an impure anthraquinone comes down, but the amount of impurities is not excessive, whereas in the condensers which bring down the tailings of the process the amount of impurities is very large and may in some cases actually exceed the amount of anthraquinone. The present invention is directed to the use of anthraquinone which is condensed in condensers maintained at a temperature sufficiently high so that the bulk of the impurities do not come down; normally, this is effected by heating the condensers with steam coil using steam from 80 to 140 pounds pressure. The temperature of the vapors in the condenser is, of course, somewhat above that of the condenser walls. It is obviously not economical to attempt to prepare silver salt from tailings in which the anthraquinone content may in some cases be actually less than that of the impurities, for while there are no impurities present which affect the shade of the dyes made from the silver salt, a great waste of reagents and very poor yields are obtained when it is attempted to use tailings.

The purification of catalytic anthraquinone by sublimation treatment and others adds considerably to its cost, and therefore the present invention very greatly cheapens the cost of silver salt since the raw material used obtained directly from the converter condensers is much cheaper than the costly, almost chemically pure anthraquinone which has been used in the past for alizarin production. The present invention, therefore, marks a large advance in the economical production of silver salt. In a similar manner other sulfonation products of anthraquinone such as gold salt, which is the 1-5 disulfo-anthraquinone, may be obtained from the same raw material.

The present invention, being based on the use of a raw material hitherto considered unusable, possesses the further advantage that it does not require a special procedure in the sulfonation step. On the contrary the general reaction conditions which have been used with chemically pure anthracene are directly applicable in the process of the present invention, making it unnecessary to use special equipment or to educate skilled silver salt chemists to perfect new reaction procedures, and thus, the present invention can directly use the vast amount of practical operating experience which has been gained in the many decades of silver salt production from chemically pure anthraquinone, and the advantages in high yields obtained by the carefully standardized process are directly applicable to the present invention, which is an added advantage thereof.

The invention will be described in the following specific examples with particular emphasis on the production of silver salt, but it should be understood that the invention is by no means limited to the details therein set forth but is equally applicable to the production of gold salt from sulfonated anthraquinones, the reaction conditions not being changed by the use of impure raw material of the present invention.

Example 1

300 pounds of anthraquinone obtained from the first or second hot condensers following a converter in a catalytic anthraquinone plant are added at a temperature of 100° C. to a sulfonator containing a mixture of 302 pounds of 25% oleum and 9 pounds of 66° Bé. sulfuric acid. The addition of the anthraquinone should be with vigorous agitation, and the temperature should not be permitted to rise above 120° C. After all of the anthraquinone has been added the temperature is progressively raised 4° C. each hour until a temperature of 156° is obtained, which is maintained for three hours. The sulfonator is then emptied into a vat diluted with 800 pounds of cold water, the heat of dilution being absorbed by suitable cooling coils and the whole mixture being cooled down to below 30° C. The mixture is then blown to a filter press and filtered, the filtrate being run into a salting vat, any cloudy filtrate being run through the press. After the batch is all filtered, water, from 70-80° C., is run through the press until the volume in the vat is 200 gallons. Thereupon, the press should be washed until acid free, the wash water being used to dilute a further batch. The filter cake contains about 146 pounds of anthraquinone which is dried in a rotary drier and reused.

The agitator in the salting out vat is stirred, and 76 pounds of soda ash are added as fast as possible consistent with a prevention of frothing over. If the frothing is excessive, it may be reduced by the addition of small amounts of turkey red oil. The addition of the soda ash should take place at 40° C., and after all of the soda ash is added the mixture should be agitated for 12 hours, dropping the temperature as low as the cooling water will permit. Thereupon, the mixture is filtered and the filtrate is run into a receiver for the disulfonic acid. After the batch is all filtered, the press is washed with 80 gallons of ice water. The press should then be blown out for 1-2 hours with compressed air and the silver salt dropped into suitable containers. The yield of silver salt is 187 pounds in the form of a 50-60% paste.

The filtrate containing the disulfo acid is treated with 400 pounds of salt and agitated for an hour, a test sample being removed and if necessary more salt being added. After complete salting out, the mixture is filtered and the filtrate discarded. The cake is then washed with 300 gallons of a 20% salt solution, dried with compressed air, and dumped into containers.

Example 2

400 pounds of catalytic anthraquinone (figured on a 100% basis) as in Example 1 are added slowly to 1500 pounds of 26% oleum, the temperature being maintained at all times below 100° C. When the addition of anthraquinone is complete, 6 pounds of mercurous sulfate are added and the bath is heated slowly to 156° C. during about one hour, after which the temperature is maintained at this point until a sample is completely soluble in water.

When this point has been reached, the batch is dropped into 8,500 pounds of water, the intense heat of solution causing a considerable temperature rise, and 2,000 pounds of salt are stirred in without cooling. When the salt is well stirred in, the batch is cooled to 20° C. or lower.

The product so obtained is filtered and washed with a saturated salt solution to approximately 3% residual acid, about 3,000 pounds of a solution being ordinarily required for this purpose. A yield of 700 pounds of 1-5 di-sulfo anthraquinone, the gold salt of the color manufacturer, is obtained of approximately 100% purity.

What is claimed as new is:

1. A method of producing sulfonated anthraquinones free from color-forming impurities, which comprises sulfonating unpurified anthraquinone from the catalytic vapor phase air oxidation of anthracene.

2. A method of producing sulfonated anthraquinones free from color-forming impurities, which comprises sulfonating unpurified anthraquinone from the catalytic vapor phase air oxidation of anthracene, the anthraquinone having been condensed in condensers the walls of which are maintained at a temperature not less than that corresponding to eighty pounds steam.

3. A method of producing silver salt, which comprises subjecting unpurified anthraquinone obtained from the catalytic vapor phase air oxidation of anthracene to sulfonation under the standard reaction conditions for the production of silver salt.

4. A method of producing silver salt, which comprises subjecting unpurified anthraquinone obtained from the catalytic vapor phase air oxidation of anthracene to sulfonation under the standard reaction conditions for the production of silver salt, the anthraquinone having been condensed in condensers the walls of which are maintained at a temperature not less than that corresponding to eighty pounds steam.

5. A method of producing sulphonated anthraquinone dye intermediates which are free from objectionable coloring matter, which comprises catalytically oxidizing anthracene in the vapor phase to form anthraquinone, without further purification, condensing the anthraquinone and subsequently sulphonating the crude material to provide the dye intermediate.

Signed at Pittsburgh, Pennsylvania this 24th day of March 1931.

ALPHONS O. JAEGER.
HERBERT J. WEST.